(12) United States Patent
Katheder

(10) Patent No.: US 7,299,635 B2
(45) Date of Patent: Nov. 27, 2007

(54) DEVICE FOR MIXING TWO FLOWS OF FLUID WHICH ARE INITIALLY GUIDED SEPARATE FROM ONE ANOTHER IN A BYPASS JET ENGINE

(75) Inventor: Karl Katheder, Munich (DE)

(73) Assignee: MTU Aero Engines GmbH, Munich (DE)

( * ) Notice: Subject to any disclaimer, the term of this patent is extended or adjusted under 35 U.S.C. 154(b) by 30 days.

(21) Appl. No.: 10/489,599

(22) PCT Filed: Aug. 29, 2002

(86) PCT No.: PCT/DE02/03157

§ 371 (c)(1),
(2), (4) Date: Sep. 22, 2004

(87) PCT Pub. No.: WO03/025378

PCT Pub. Date: Mar. 27, 2003

(65) Prior Publication Data

US 2005/0022502 A1 Feb. 3, 2005

(30) Foreign Application Priority Data

Sep. 14, 2001 (DE) .................... 101 45 489

(51) Int. Cl.
*F02K 1/00* (2006.01)

(52) U.S. Cl. ........................................ 60/770

(58) Field of Classification Search ............... 60/262, 60/263, 269, 226.1, 770; 239/265.17, 265.19, 239/265.27
See application file for complete search history.

(56) References Cited

U.S. PATENT DOCUMENTS 2,971,327 A * 2/1961 Moy et al. ............. 239/265.17

(Continued)

FOREIGN PATENT DOCUMENTS

DE 40 28 259 8/1991

(Continued)

*Primary Examiner*—William H. Rodriguez
(74) *Attorney, Agent, or Firm*—Crowell & Moring LLP

(57) ABSTRACT

The invention relates to a device for mixing two fluid flows, initially guided separately from one another, in a two-circuit reaction engine, a mixing tube which encloses a hot core stream being provided, along the outer shaped lateral surface of which a cold bypass flow flows. The mixing tube is designed in the form of a truncated cone narrowing in the direction of flow and has openings arranged at the downstream end in the circumferential direction of the mixing-tube lateral surface in a cross-sectional plane lying perpendicularly to the longitudinal axis of the mixing tube. The hot core stream flowing through the mixing tube penetrates through the openings into the cold bypass flow flowing around the mixing-tube lateral surface. The openings have passage areas of elliptical shape with a major axis and a minor axis, the major axis of the passage areas running on the lateral surface of the mixing tube in the direction of flow of the fluids and the minor axis running perpendicularly thereto.

13 Claims, 2 Drawing Sheets

U.S. PATENT DOCUMENTS

| | | | |
|---|---|---|---|
| 2,987,883 A | 6/1961 | Lawler | |
| 3,002,341 A | 10/1961 | Muzzy et al. | |
| 3,065,818 A * | 11/1962 | Lombard et al. | 181/213 |
| 3,153,319 A | 10/1964 | Young et al. | |
| 3,196,608 A | 7/1965 | Tindale | |
| 3,587,777 A | 6/1971 | Ellis | |
| 3,592,291 A * | 7/1971 | Medawar et al. | 181/220 |
| 3,612,212 A | 10/1971 | Macdonald | |
| 3,830,431 A * | 8/1974 | Schwartz | 239/265.11 |
| 4,165,609 A * | 8/1979 | Rudolph | 60/262 |
| 4,214,441 A * | 7/1980 | Mouritsen et al. | 60/262 |
| 4,215,536 A * | 8/1980 | Rudolph | 60/262 |
| 4,226,297 A * | 10/1980 | Cicon | 181/213 |
| 4,292,803 A | 10/1981 | Prior | |
| 4,398,667 A * | 8/1983 | Maestrello | 239/265.17 |
| 4,817,379 A * | 4/1989 | Bagley | 60/761 |
| 4,819,425 A * | 4/1989 | Farquhar et al. | 60/226.1 |
| 5,117,628 A | 6/1992 | Koshoffer | |
| 5,184,459 A * | 2/1993 | McAndrews | 60/226.3 |
| 5,758,488 A | 6/1998 | Batey | |
| 5,884,843 A * | 3/1999 | Lidstone et al. | 239/265.13 |
| 6,640,537 B2 * | 11/2003 | Tse | 60/262 |
| 6,786,038 B2 * | 9/2004 | Lair | 60/226.1 |
| 6,845,607 B2 * | 1/2005 | Lair | 60/263 |

FOREIGN PATENT DOCUMENTS

| | | |
|---|---|---|
| FR | 1086315 | 2/1955 |
| GB | 2 160 265 | 12/1985 |

* cited by examiner

DEVICE FOR MIXING TWO FLOWS OF FLUID WHICH ARE INITIALLY GUIDED SEPARATE FROM ONE ANOTHER IN A BYPASS JET ENGINE

BACKGROUND AND SUMMARY OF THE INVENTION

Device for mixing two flows of fluid, which are initially guided separate from one another, in a bypass jet engine The invention relates to a device for mixing two fluid flows, which are initially guided separately from one another, in a bypass jet engine.

To this end, it is known that "lobe mixers" are used in bypass jet engines in order to mix the hot core stream of the jet engine and the cold bypass flow before discharge from the jet engine nozzle. In this case, the hot core stream of the jet engine is guided through a "mixing tube", whereas the cold bypass flow flows along the outside of the mixing-tube lateral surface. The mixing of the two fluid flows is forced by the special shaping of the downstream lateral surface of the mixing tube. For this purpose, that lateral surface of the mixing tube which is formed downstream has "lobes" which extend radially outward. In this case, after flow has taken place through or respectively around the downstream section of the mixing tube, these lobes direct said hot core stream into the cold bypass flow, and also direct the cold bypass flow into the hot core stream. With regard to the known prior art, reference is made, for example, to GB 2 160 265 A.

A disadvantage with these known lobe mixers is in this case the fact that the lobe mixers, on account of the large radial extent of the lobes at the downstream end, tend to vibrate and in addition deformations occur due to material heating and pressure differences. It has therefore been attempted to remove these disadvantages by "struts" which support the lobe mixer on the outlet cone or the nozzle housing of the reaction engine. However, these struts constitute an additional source of weight.

In addition, on account of the large radial extent of the lobes of the lobe mixer, interference may occur in the region of the engine suspension between the lobes of the lobe mixer and the engine suspension. To avoid such interference, the relevant lobes of the lobe mixer, the "pylon lobes", are designed differently. However, this has the disadvantage that a decrease in the mixing efficiency is associated with the redesign of the "pylon lobes".

The object of the invention is to provide a remedy here by a new design of the device for mixing the hot core stream of the reaction engine with the cold bypass flow.

Based on a device of the type mentioned at the beginning, this object is achieved according to the invention in that the mixing tube is designed in the form of a truncated cone narrowing in the direction of flow of core stream and bypass flow, and in that the mixing tube has openings arranged at the downstream end in the circumferential direction of the mixing-tube lateral surface in a cross-sectional plane lying perpendicularly to the longitudinal axis of the mixing tube, through which openings the hot core stream flowing through the mixing tube penetrates into the cold bypass flow flowing around the mixing-tube lateral surface.

The mixing tube design according to the invention leads to substantial advantages. By the openings being provided in the mixing-tube lateral surface, lobe mixers with the large radial extent of their lobes are dispensed with. The vibration tendency is thus substantially reduced, so that the hitherto requisite struts are dispensed with. The risk of possible interference with the engine suspension thus does not arise either. In addition, the smaller radial extent has the advantage that the novel mixing tube according to the invention is also suitable for confined installations.

Furthermore, the closed annular lateral surface at the downstream end of the mixing tube leads to a robust, low-vibration construction, so that disturbances on account of fluctuations in operating pressure and temperature have less effect on the mixing tube. Since supporting struts are no longer necessary for fixing the mixing tube, this omission of the supporting struts at the same time also entails a lighter construction and thus lower weight of the reaction engine.

Furthermore, the simplified form of the mixing tube leads to a more cost-effective production, since the complicated deep-drawing operations required for producing the lobes are dispensed with.

According to a further feature of the invention, the openings in the mixing-tube lateral surface have passage areas of elliptical shape with a major axis and a minor axis. In this case, the major axis of the elliptical passage areas runs on the mixing-tube lateral surface in the direction of flow of the hot core stream and of the cold bypass flow, and the minor axis is arranged perpendicularly thereto.

Further features of the invention follow from the subclaims.

A combination of the novel mixing tube according to the invention with sufficiently well-known conventional lobe mixers is possible. The replacement of existing mixers with mixers according to the invention is conceivable, since the changes of the new mixer regarding mixer efficiency (lower) and overall pressure loss (lower) act in a neutral manner with regard to the gain in thrust.

The invention is described below with reference to an exemplary embodiment shown more or less schematically in the drawing.

DETAILED DESCRIPTION OF THE DRAWINGS

Figure 1:
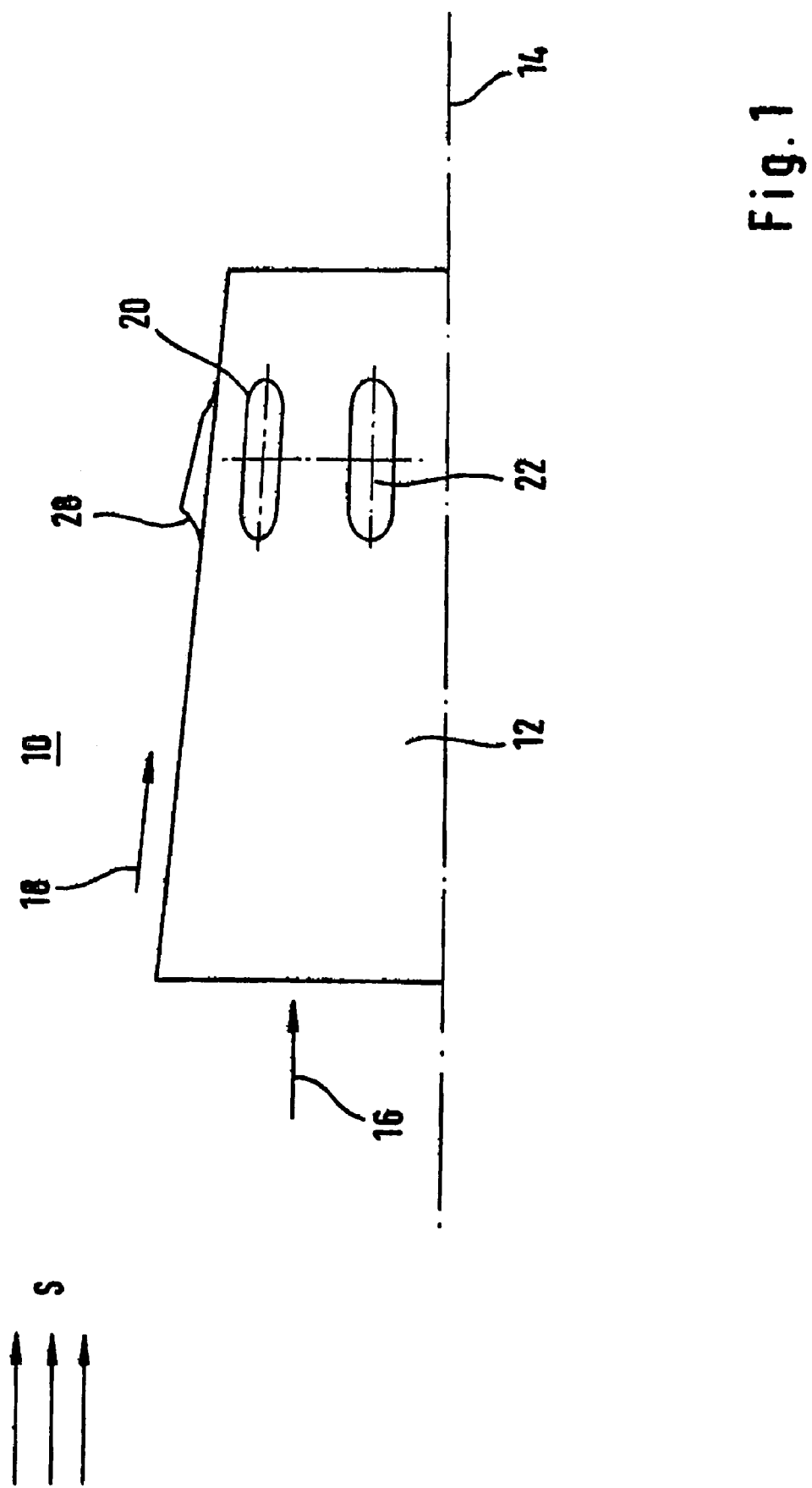
FIG. 1 shows a sectional representation of a mixing tube of a two-circuit reaction engine in the form of a truncated cone with openings distributed over the circumference of the truncated cone.

A mixing tube designated overall by the reference numeral 10 in FIG. 1 and intended for mixing two fluid flows, initially guided separately from one another, in a two-circuit reaction engine comprises a lateral surface 12 and a longitudinal axis 14. The direction of flow of the fluid flows to be mixed, that is to say of a hot core stream 16 and of a cold bypass flow 18, is indicated by the arrows S.

In this case, the mixing tube 10 is in the form of a truncated cone narrowing in the direction of flow S. The other components of a reaction engine, apart from the mixing tube 10, are not shown for reasons of clarity.

At the downstream end of the mixing tube 10, a plurality of openings 20 are incorporated in the mixing-tube lateral surface 12 in the circumferential direction of the mixing-tube lateral surface 12 in a cross-sectional area lying perpendicularly to the longitudinal axis 14 of the mixing tube 10.

Figure 2:
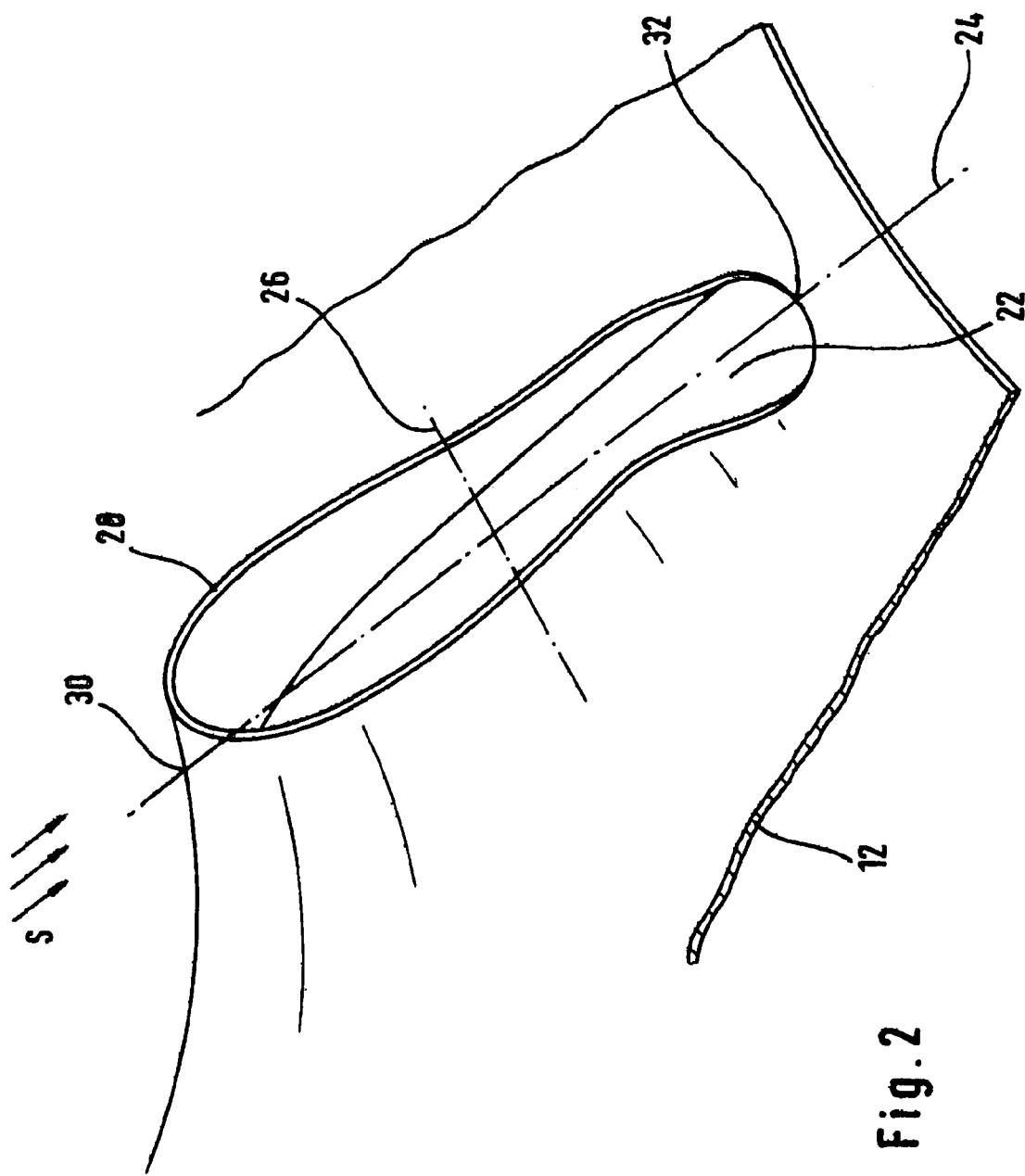
FIG. 2 shows an enlarged representation of an opening from FIG. 1.

An enlarged representation of one of the openings 20 lying at the downstream end of the mixing tube 10 is shown in FIG. 2.

In this case, the openings 20 have a passage area 22 of elliptical shape with a major axis 24 and a minor axis 26. Whereas the major axis 24 of the passage areas 22 runs on the mixing-tube lateral surface 12 in the direction of flow S, the minor axis 26 is arranged perpendicularly thereto.

In addition, the elliptical passage areas 22 have a hole collar 28 on the outside of the mixing-tube lateral surface 12.

As FIG. 2 shows, the height of the hole collar 28 is designed in such a way that the maximum height of the hole collar 28 is located at the upstream apex 30 of the major axis 24 of the elliptical passage areas 22 and decreases from there in the direction of flow S. A region of the downstream apex 32 of the major axis 24 of the elliptical passage areas 22 is formed without a hole collar 28. It may alternatively be bent inward (relative to the mixing-tube lateral surface 12).

In the present exemplary embodiment, the transition from the outside of the mixing-tube lateral surface 12 to the hole collar 28 is of concave design; other continuous configurations are also possible.

The mode of operation of the device described above is as follows:

Whereas the hot core stream 16 coming from the reaction engine flows through the conical mixing tube 10, the cold bypass flow 18 flows around the mixing-tube lateral surface 12. The hot core stream 16 flowing through the mixing tube 10 penetrates through the openings 20 at the downstream end of the mixing tube 10 into the cold bypass flow 18 flowing around the mixing-tube lateral surface 12. As a result of the design of the passage area 22 and of the hole collar 28, good intermixing of the two fluid flows is achieved with low pressure losses, this intermixing corresponding to the greatest possible extent to that of the known lobe mixers.

The invention claimed is:

1. A mixing tube for enclosing and guiding a hot core stream of a jet engine, said mixing tube having a lateral wall with a laterally outward facing surface over which a cold bypass flow flows and a laterally inward facing surface over which the hot core stream flows;
   wherein said mixing tube is configured as a truncated cone which narrows in a direction of flow through the mixing tube;
   wherein mixing openings extend laterally through said lateral wall of the mixing tube at its downstream end to accommodate flow therethrough of portions of the hot core stream which then penetrates into the cold bypass flow along the outward facing surface;
   wherein the openings have a passage area of elliptical shape with a major axis and a minor axis; and
   wherein the major axis of the passage area runs on the lateral wall of the mixing tube in the direction of flow and the minor axis of the passage area runs perpendicularly thereto.

2. A mixing tube for enclosing and guiding a hot core stream of a jet engine, said mixing tube having a lateral wall with a laterally outward facing surface over which a cold bypass flow flows and a laterally inward facing surface over which the hot core stream flows;
   wherein said mixing tube is configured as a truncated cone which narrows in a direction of flow through the mixing tube;
   wherein mixing openings extend laterally through said lateral wall of the mixing tube at its downstream end to accommodate flow therethrough of portions of the hot core stream which then penetrates into the cold bypass flow along the outward facing surface;
   wherein the openings have a passage area of elliptical shape with a major axis and a minor axis; and
   wherein the passage area has a hole collar on the laterally outward facing surface of the lateral wall of the mixing tube.

3. A mixing tube according to claim 2, wherein a transition from the laterally outward facing surface of the lateral wall of the mixing tube to the hole collar of the passage area is of concave design.

4. A mixing tube according to claim 2, wherein a height of the hole collar with respect to the laterally outward facing surface of the lateral wall of the mixing tube varies in such a way that a maximum height of the hole collar is located at an upstream apex of the major axis of the elliptical passage area and decreases from there in the direction of flow.

5. A jet engine comprising a mixing tube for enclosing and guiding a hot core stream of the jet engine, said mixing tube having a lateral wall with a laterally outward facing surface over which a cold bypass flow flows and a laterally inward facing surface over which the hot core stream flows;
   wherein said mixing tube is configured as a truncated cone which narrows in a direction of flow through the mixing tube;
   wherein mixing openings extend laterally through said lateral wall of the mixing tube at its downstream end to accommodate flow therethrough of portions of the hot core stream which then penetrates into the cold bypass flow along the outward facing surface;
   wherein the openings have a passage area of elliptical shape with a major axis and a minor axis; and
   wherein the major axis of the passage area runs on the lateral wall of the mixing tube in the direction of flow and the minor axis of the passage area runs perpendicularly thereto.

6. A jet engine comprising a mixing tube for enclosing and guiding a hot core stream of the jet engine, said mixing tube having a lateral wall with a laterally outward facing surface over which a cold bypass flow flows and a laterally inward facing surface over which the hot core stream flows;
   wherein said mixing tube is configured as a truncated cone which narrows in a direction of flow through the mixing tube;
   wherein mixing openings extend laterally through said lateral wall of the mixing tube at its downstream end to accommodate flow therethrough of portions of the hot core stream which then penetrates into the cold bypass flow along the outward facing surface;
   wherein the openings have a passage area of elliptical shape with a major axis and a minor axis; and
   wherein the passage area has a hole collar on the laterally outward facing surface of the lateral wall of the mixing tube.

7. A jet engine according to claim 6, wherein a transition from the laterally outward facing surface of the lateral wall of the mixing tube to the hole collar of the passage area is of concave design.

8. A jet engine according to claim 6, wherein a height of the hole collar with respect to the laterally outward facing surface of the lateral wall of the mixing tube varies in such a way that a maximum height of the hole collar is located at an upstream apex of the major axis of the elliptical passage area and decreases from there in the direction of flow.

9. Device for mixing a hot core stream flow and a cold bypass flow in a jet engine with said flows initially being guided separately from one another, comprising a mixing tube which encloses the hot core stream flow with the cold bypass flow flowing along an outer surface of the mixing tube, wherein the mixing tube has a truncated cone shape narrowing in a direction of the flows, wherein the mixing tube has openings arranged at a downstream end portion thereof for accommodating flow of at least a portion of the hot core stream flow into the cold bypass flow, and wherein the openings have a hole collar on the outer surface of the mixing tube.

10. Device according to claim 9, wherein the openings have a passage area of elliptical shape with a major axis and a minor axis, and wherein the major axis of the passage area runs on the outer surface of the mixing tube in the direction of the flows and the minor axis of the passage area runs perpendicularly thereto.

11. Device according to claim 10, wherein a height of the hole collar with respect to the outer surface of the mixing tube varies in such a way that a maximum height of the hole collar is located at an upstream apex of the major axis of the elliptical passage area and decreases from there in the direction of the flow.

12. Device according to claim 10, wherein a transition from the outer surface of the mixing tube to the hole collar is of concave design.

13. Device according to claim 9, wherein a transition from the outer surface of the mixing tube to the hole collar is of concave design.

* * * * *